United States Patent
Sang et al.

(10) Patent No.: US 12,109,789 B2
(45) Date of Patent: Oct. 8, 2024

(54) SELF-RELEASING, UV BLOCKING SURFACING MATERIALS FOR COMPOSITE PARTS

(71) Applicant: CYTEC INDUSTRIES INC., Princeton, NJ (US)

(72) Inventors: Junjie Jeffrey Sang, Newark, DE (US); Dalip K. Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 71 days.

(21) Appl. No.: 16/482,907

(22) PCT Filed: Dec. 20, 2018

(86) PCT No.: PCT/US2018/066641
§ 371 (c)(1),
(2) Date: Aug. 1, 2019

(87) PCT Pub. No.: WO2019/133405
PCT Pub. Date: Jul. 4, 2019

(65) Prior Publication Data
US 2020/0316823 A1    Oct. 8, 2020

Related U.S. Application Data

(60) Provisional application No. 62/610,391, filed on Dec. 26, 2017.

(51) Int. Cl.
*B32B 27/38* (2006.01)
*B29C 37/00* (2006.01)
(Continued)

(52) U.S. Cl.
CPC .......... *B32B 27/38* (2013.01); *B29C 37/0032* (2013.01); *B29C 37/0075* (2013.01);
(Continued)

(58) Field of Classification Search
CPC . B29C 37/0075; B29C 70/30; B29C 37/0032; B32B 27/20; B32B 9/007; B32B 15/092; B32B 27/38; B29K 2101/12
See application file for complete search history.

(56) References Cited

U.S. PATENT DOCUMENTS

2002/0176973 A1* 11/2002 Keiser ................... B32B 27/327
428/212
2003/0003317 A1* 1/2003 Chang .................... B32B 27/06
428/558

(Continued)

FOREIGN PATENT DOCUMENTS

AU       2012241121 A1    11/2012
WO       2017112766 A1     6/2017

*Primary Examiner* — Samir Shah
(74) *Attorney, Agent, or Firm* — Thi Dang

(57) ABSTRACT

A surfacing material that is capable of ultraviolet (UV) protection and self-releasing from a mold surface. The surfacing material is a multilayer structure composed of a curable resin layer laminated to a self-releasing layer. The surfacing material is designed to be co-cured with a composite substrate, for example, a prepreg layup. After co-curing, the composite part surfaced with the surfacing material is releasable from the mold surface with ease. The self-releasing layer functions as a UV blocking layer until the cured composite substrate is ready for painting. When the self-releasing layer removed, a paint-ready surface is revealed. Such surface does not require any surface preparation prior to painting.

13 Claims, 2 Drawing Sheets

(51) Int. Cl.
    *B29C 70/00*          (2006.01)
    *B29C 70/30*          (2006.01)
    *B32B 9/00*            (2006.01)
    *B32B 15/092*        (2006.01)
    *B32B 27/20*          (2006.01)
    *B29K 63/00*          (2006.01)
    *B29K 101/12*        (2006.01)
    *B29K 509/02*        (2006.01)

(52) U.S. Cl.
    CPC ............ *B29C 70/003* (2021.05); *B29C 70/30* (2013.01); *B32B 9/007* (2013.01); *B32B 15/092* (2013.01); *B32B 27/20* (2013.01); *B29K 2063/00* (2013.01); *B29K 2101/12* (2013.01); *B29K 2509/02* (2013.01); *B32B 2255/10* (2013.01); *B32B 2255/26* (2013.01); *B32B 2264/108* (2013.01); *B32B 2307/71* (2013.01); *B32B 2307/748* (2013.01)

(56) References Cited

U.S. PATENT DOCUMENTS

| | | | |
|---|---|---|---|
| 2013/0149934 A1 | 6/2013 | Sang et al. | |
| 2013/0189387 A1* | 7/2013 | Bravet | B29C 48/92 |
| | | | 525/200 |
| 2014/0154496 A1* | 6/2014 | Sang | C08G 59/38 |
| | | | 428/313.9 |
| 2014/0178620 A1* | 6/2014 | Yutou | C08L 33/06 |
| | | | 428/41.4 |
| 2017/0145256 A1* | 5/2017 | Huang | C09D 183/04 |

\* cited by examiner

SELF-RELEASING, UV BLOCKING SURFACING MATERIALS FOR COMPOSITE PARTS

CROSS-REFERENCE TO RELATED APPLICATIONS

The present application is a U.S. national phase entry under 35 U.S.C. § 371 of International Application No. PCT/US2018/066641, filed on Dec. 20, 2018, which claims priority to U.S. provisional application No. 62/610,391, filed on Dec. 26, 2017, the entire content of each of these applications is explicitly incorporated herein by reference.

DETAILED DESCRIPTION

Fiber-reinforced, polymer matrix composite (PMC) is a high-performance structural material that is commonly used in applications requiring resistance to aggressive environments, high strength, and/or low weight. Examples of such applications include aircraft components (e.g., tails, wings, fuselages, and propellers), high performance automobiles, boat hulls, and bicycle frames. Composite structural parts for aerospace applications typically include a surfacing film to provide the required performance characteristics to the composite structures prior to painting. These surfacing films are used to improve the surface quality of the structural parts while reducing labor, time and cost. The surfacing films are usually co-cured with the fiber-reinforced polymer matrix composite materials during the manufacturing of the structural parts.

Conventional epoxy-based surfacing films have been found to lack ultraviolet (UV) resistance such that, after exposure to UV radiation, they showed color change and/or surface degradation, i.e. chalking and loss of paint adhesion. To overcome this shortcoming, a paint primer with UV protection components is typically applied to cover all exposed composite surfaces soon after de-molding the cured part from the mold. The drawbacks to using such paint primer include high labor cost, high maintenance cost, added weight and adverse environmental impacts due to organic solvents typically used in the paint primers. The use of gel coats or other protective coatings such as paint have been the more effective way of protecting the surfacing film from UV exposure and abrasion. However, both gel coats and paints require regular maintenance and are not considered permanent fixes.

Figure 1:
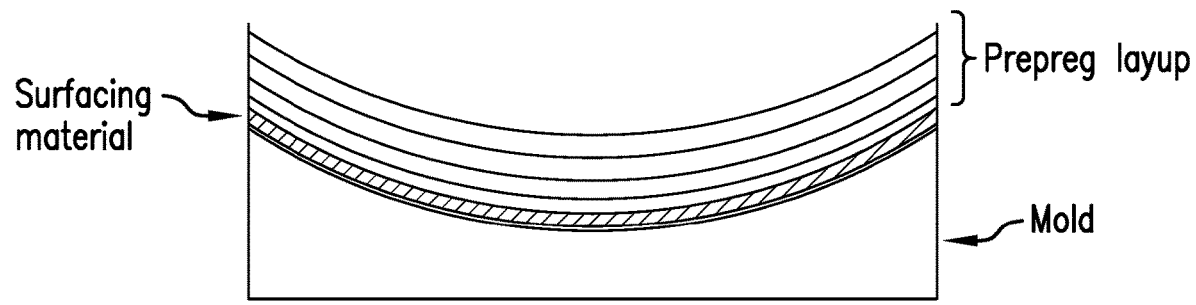
FIG. 1 schematically shows a prepreg layup with a surfacing material being formed on a molding tool.

Another aspect of aerospace composite manufacturing is that the exposed surfaces of composite parts require a highly smooth surface prior to painting. To that end, surfacing films are routinely integrated into the fabrication of component parts to achieve such smooth surface. In the case of concave mold surface, a curable surfacing film may be placed onto a mold surface prior to laying down the composite prepreg plies. FIG. 1 schematically shows a mold with a concave surface and the placement of a co-curable surfacing material (in the form of a film) over the concave surface of the mold prior to laying down a plurality of prepreg plies, forming a prepreg layup. The surfacing material and the prepreg layup are co-cured to form a composite part. After curing, it is common to remove mold release by sanding followed by the application of a curable filler to fill in cracks and holes. The filler is then cured and sanded repeatedly to provide a smooth surface. This is followed by the application of a paint primer, sanding, reapplying paint primer, and then applying a finishing top coat of paint. This conventional process involves a high amount of labor and requires refinishing on a periodic basis. These recurring steps add significant cost to the manufacturing of composite parts.

In order to prevent the finished molded part from sticking or adhering to the mold surface, a mold release agent is typically applied to the mold surface prior to laying down the prepreg plies onto the mold. Mold release agents are usually formed on the molds for facilitating the release of the cured parts from the molds on which they are formed. It is important for molded composite parts to be released from the mold surface using minimal force, especially for the aerospace composite parts, because the parts are often quite large and difficult to handle.

The choice of mold release agents (MRAs) affects the finish characteristics of the released part like gloss level, accurate texture reproduction, post molding operations (e.g. adhesion or painting/coating of the molded part) in addition to influencing the mold service life in between maintenance cycles, and overall productivity. MRAs can be applied in different ways to prepare the mold surface. They may be applied by hand wiping or applied with a brush, a coater or spray equipment, and they provide chemical- and heat-resistant barriers between the mold and the composite part. There are four distinct types of release systems: paste wax, liquid polymer, PVA (polyvinyl alcohol) and semi-permanent. Unlike wax/parting film systems, semi-permanent mold releases bond to the mold surface rather than the part.

The use of mold release agent on a mold surface enables the cured part to separate from the mold while providing high quality surface to the part. However, mold preparation with MRAs is a multi-step, labor-intensive and costly process. As an example, a mold preparation may begin with sanding to impart a smooth, satin finish. Next, the mold surface is further improved by buffing out sanding marks to achieve highly polished finish. After buffing, a mold sealer is used. Finally, paste wax is applied and buffed. Post-molding operation may include removal of MRA build up, MRA contamination, eliminating streaking or other surface defects, re-apply MRA after each cycle. Such post-molding operation adds additional time and cost to the manufacturing process.

One aspect of the present disclosure is directed to a surfacing material with a self-releasing/UV blocking layer incorporated therein to provide UV protection prior to painting. The self-releasing/UV blocking layer is capable of self-releasing from a mold surface, which does not contain any conventional mold release agent. That is, the UV blocking layer can be easily removed from a mold surface without any aid of a conventional molding agent on the mold surface. As such, it would not be necessary to apply a conventional mold release agent onto the mold surface prior to applying the surfacing material thereon. The self-releasing/UV blocking layer is designed to be a temporary protection layer for composite surface and can be removed after co-curing of the surfacing material with a composite substrate. The surface being revealed after removal of the UV blocking layer is ready for painting without the conventional intervening surface treatments, i.e., the revealed surface is "paint-ready".

Figure 2:
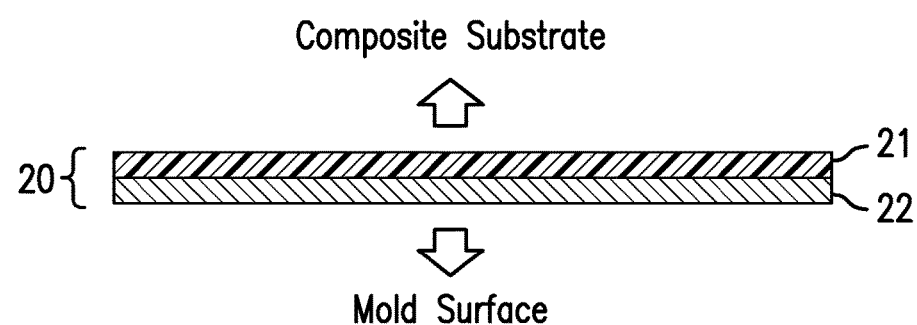
FIG. 2 schematically illustrates a surfacing material with a self-releasing, UV blocking layer according to one embodiment.

According to one embodiment shown in FIG. 2, the surfacing material 20 is a multilayer structure that includes a curable resin layer 21 and a self-releasing, UV blocking layer 22. The layers are laminated together to form an integrated structure. The curable resin layer 21 will be in contact with a curable composite substrate, e.g., a prepreg layup, while the self-releasing/UV blocking layer 22 will be in contact with the mold surface of a tool during composite part manufacturing. The surfacing material 20 is designed to be co-cured with a curable composite substrate, e.g., a prepreg layup.

After the composite substrate and the surfacing material have been co-cured, the resulting composite part is easily removable from the tool and can be left in this form at ambient temperature until the composite part is ready for painting. The self-releasing layer 22 functions as a UV protective layer until the composite part is ready for painting.

Figure 3:
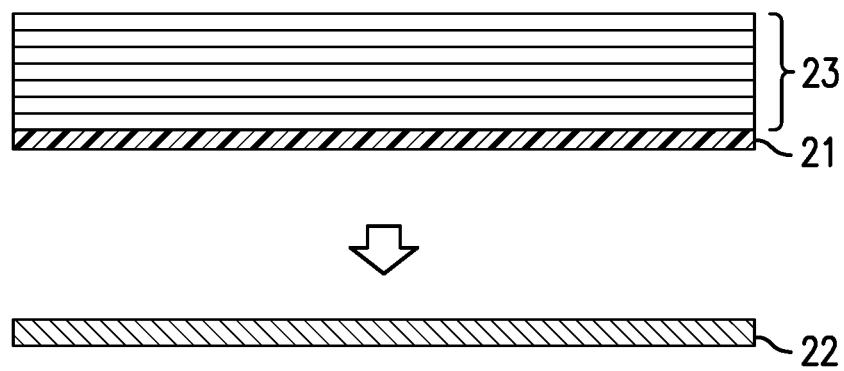
FIG. 3 illustrates the application of the surfacing material shown in FIG. 2 on a composite substrate.

As illustrated in FIG. 3, the self-releasing/UV blocking layer 22 can be removed from the underlying cured layer 21 to reveal a surface that is ready for painting without requiring any intervening re-finishing or surface treatment such as sanding and filling. To ease the removal process, the length and/or width of the layer 22 may be configured to extend beyond an edge of the resin layer 21.

As an option, a non-removable textile carrier may be laminated to the side of the curable resin layer 21 that is not in contact with the self-releasing/UV blocking layer 22 or is embedded in the resin layer 21. Such textile carrier remains as an integrated structure in the final composite part. The textile carrier may be in the form of a nonwoven veil or woven fabric composed of glass fibers or polymeric fibers such as polyester.

Figure 4:
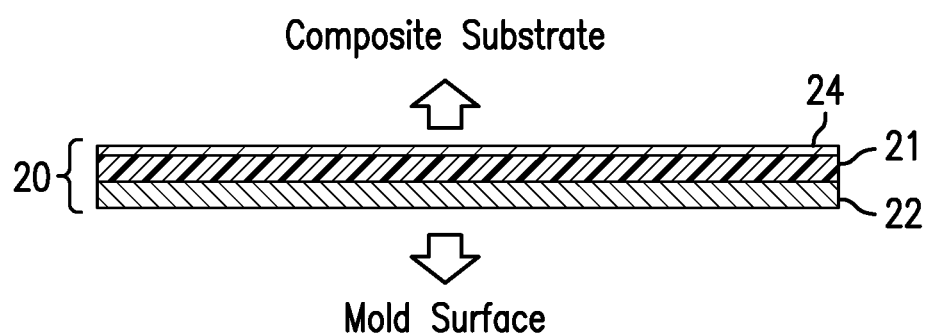
FIG. 4 schematically illustrates a self-releasing, UV blocking surfacing material capable of lightning strike protection (LSP) according to another embodiment.

In another embodiment shown in FIG. 4, the multilayer surfacing material further includes an electrically conductive layer 24 adjacent to the curable resin layer 21 such that the curable resin layer 21 is between the self-releasing/UV blocking layer 22 and conductive layer 24. The conductive layer 24 will be in contact with the composite substrate. Such conductive layer will provide lightning strike protection (LSP) to the final composite part.

As an option, a non-removable textile carrier may be laminated to one side of the curable resin layer 21 such that the textile carrier is interposed between the resin layer 21 and the conductive layer 24. Alternatively, the textile carrier is embedded in the resin layer 21. As discussed previously, such textile may be in the form of a nonwoven veil or woven fabric composed of glass fibers or polymeric fibers such as polyester.

Self-Releasing/UV Blocking Layer

The self-releasing/UV blocking layer is designed to block the UV light transmission completely within 200-800 nm UV-visible range and to be self-releasing from a tool surface.

According to one embodiment, the self-releasing/UV blocking layer is composed of a thermoplastic polymer layer coated on one or both sides with a mold-release coating. The mold-release coating is made of a fluoropolymer or an organosilicon polymer. When the mold-release coating is only on one side of the thermoplastic polymer layer, the coating is the outermost layer, which will be in contact with the tool surface.

The fluoropolymer may be selected from, but are not limited to, polytetrafluoroethylene (PTFE), polyvinylidene fluoride (PVDF), polyvinylfluoride (PVF), fluorinated ethylene-propylene (FEP), polychlorotrifluoroethylene (PCTFE), perfluoroalkoxy polymer (PFA), polyethylenetetrafluoroethylene (ETFE), polyethylenechlorotrifluoro-ethylene (ECTFE), perfluoropolyether (PFPE), and combinations thereof. PTFE is particularly suitable. The fluoropolymer coated onto the thermoplastic polymer layer may have a thickness of up to 20 μm.

The organosilicon polymer coating contains elemental silicon (e.g., 19-26 at %), oxygen (e.g., 30-45 at %), and carbon (e.g., 33-48 at %). "at %" means atom percentage. The organosilicon polymer can be deposited onto the thermoplastic polymer layer by a conventional plasma polymer process from the gas phase, preferably that the plasma polymer layer is produced with the aid of siloxane-containing compounds as precursors, most preferably, with hexamethyldisiloxane (HMDSO). The adhesion (or the release behavior) of the organosilicon plasma polymer layer to the thermoplastic polymer layer can be tailored by changing the composition of organosilicon polymer coating. The thickness of the organosilicon polymer layer may be up to 2 μm.

The fluoropolymer or organosilicon polymer coating may have an areal or film weight in the range of about 5 gsm to about 40 gsm in total (on both sides).

The thermoplastic polymer layer may be selected from: thermoplastic polyester elastomers (TPE-E); thermoplastic co-polyesters (TPC), in particular polyetheresters; cross-linked thermoplastic elastomers based on olefins (TPE-V/TPV), in particular mixtures of polypropylene and ethylene-propylene-diene rubber (EPDM/PP); thermoplastic elastomers based on urethanes (TPE-U/TPU); mixtures of natural rubber and polypropylene (NR/PP); mixtures of nitrile rubber and polypropylene (NBR/PP), and mixtures of ethylene-vinyl acetate and polyvinylidene chloride (EVA/PVDC), or a thermoplastic polymer, preferably selected from the group consisting of polyolefin, in particular polymethylpentene (PMP), and also polyolefin copolymers; polyamide, in particular nylon-6,6, and also poly-ε-caprolactam; polyethylene terephthalate (PET), and polyimide (PI). The thermoplastic polymer layer can be produced by film extrusion.

To provide built-in UV blocking and protection, the thermoplastic polymer layer may further contain one or more UV stabilizer(s) or absorber(s) therein in an amount of about 0.5% to about 5% by weight based on the total weight of the thermoplastic polymer layer. Furthermore, inorganic pigments, such as metal oxide pigments, carbon-based materials such as carbon black, graphene, graphite oxide, etc., may also be incorporated into the thermoplastic polymer layer. Carbon-based nanomaterials are particularly suitable. The term "carbon-based" means containing carbon as a major component. The term "nanomaterials" refers to materials of which a single unit is sized (in at least one dimension) between 1 to 1000 nm. In one embodiment, the thermoplastic polymer layer contains carbon black particles with particle size of 100 nm or less. Such carbon-based materials also provide color to the thermoplastic polymer layer.

Examples of UV stabilizers include butylated hydroxytoluene (BHT); 2-hydroxy-4-methoxy-benzophenone (e.g. UV-9); 2,4-bis(2,4-dimethylphenyl)-6-(2-hydroxy-4-octyloxyphenyl)-1,3,5-triazine (e.g. CYASORB® UV-1164 light absorber); 3,5-di-tert-butyl-4-hydroxybenzoic acid; n-hexadecyl ester (e.g. CYASORB® UV-2908 light stabilizer); Pentaerythritol Tetrakis(3-(3,5-di-tert-butyl-4-hydroxyphenyl) propionate (e.g. IRGANOX 1010). Liquid hindered-amine light stabilizer from Ciba Specialty Chemicals, such as 2-(2H-benzotriazol-2-yl)-4,6-ditertpentylphenol (e.g. TINUVIN 328), Methyl 1,2,2,6,6-pentamethyl-4-piperidyl sebacate (e.g. TINUVIN 292). Decanedioic acid, bis(2,2,6,6-tetramethyl-1-(octyloxy)-4-piperidinyl ester (e.g. TINUVIN 123), and 2,2,6,6-tetramethyl-4-piperidinyl stearate (e.g. CYASORB® UV-3853 from Cytec Specialty Chemicals) may also be used as suitable UV stabilizers.

Suitable inorganic metal oxide pigments include nano-sized zinc oxide (n-ZnO), e.g. NanoSunGuard 3015, and nano-sized titanium dioxide particles (n-$TiO_2$) may also be added to enhance UV protection. Particularly suitable are nano-sized $TiO_2$ particles in the crystalline form of rutile, for example, $TiO_2$ pigments sold under the trademark Ti-Pure® by DuPont. "nano-sized" as used herein includes particle sizes of less than 1 micron. For example, particles having particle size in the range of 100 nm to 500 nm, are suitable. Particle size can be measured by a laser diffraction technique, for example, using a Malvern Mastersizer 2000 instrument. In some embodiments, a high amount of $TiO_2$ particles, preferably, rutile $TiO_2$ particles, are added in an amount of about 40% to about 65% by weight based on the total weight of the thermoplastic polymer layer.

Aside from carbon black and carbon-based materials discussed above, other color pigments and/or dyes, for example, red iron oxide and green chromium, may be added to the thermoplastic polymer layer to provide color and enhance UV blocking.

The total thickness of the self-releasing/UV blocking layer may be within the range of 10-250 micron (μm), in some embodiments, 30-80 μm, in other embodiments 40-60 μm. The self-releasing layer may be formulated to have high elongation of more than 300% as determined by ASTM D638, to be highly elastic and thermally stable up to 190° C. Such material is particularly suitable for making fiber reinforced composite parts in a variety of composite manufacturing processes, e.g., autoclave, vacuum-bag molding, and press process.

Conductive Layer

The conductive layer may a continuous nonporous layer such as a solid metal foil or a porous layer such as an expanded metal screen. The conductive layer preferably has a resistivity of less than 10 mΩ, more preferably, less than 5 mΩ. Moreover, the conductive layer preferably has a thickness of ≤3 mils (76.2 μm). In one embodiment, the conductive layer is a thin, nonporous metal foil having a thickness within the range of 3 μm to 75 μm. In another embodiment, the conductive layer is an expanded metal screen with an areal weight within the range of 60 gsm to 350 gsm.

The nonporous and porous conductive layer may be formed of metals selected from: copper, aluminum, bronze, titanium, alloys and combinations thereof. Alternatively, the conductive layer may be formed of a non-metallic material with intrinsic electrical conductivity such as carbon. Carbon in this context includes graphite. The nonporous conductive layer may be a carbon sheet, including graphene sheet and carbon-nanotube (CNT) paper. A specific example of CNT paper is flexible CNT Bucky paper.

Curable Resin Layer

The curable resin layer in the multilayer surfacing material (layer 21 in FIGS. 2 and 4) is formed from a thermoset resin composition containing one or more thermoset resins as major components. The compositions of the resin layers may be the same or different from each other.

The curable resin layer may have a film weight of less than 0.1 psf (or 500 gsm), for example, 0.01-0.05 psf (or 50-250 gsm).

The terms "cure" and "curing" as used herein refer to the irreversible hardening of a pre-polymer material, a resin or monomers brought about by heating at elevated temperatures, exposure to ultraviolet light and radiation, or chemical additives. The term "curable" means can be cured into a hardened material.

Examples of suitable thermoset resins include, but are not limited to, epoxies, phenolic resins, cyanate esters, bismaleimides, benzoxazines (including polybenzoxazines), unsaturated polyesters, vinyl ester resins, and combinations thereof.

In some embodiments, the thermoset resin composition contains one or more multifunctional epoxy resins or polyepoxides and a curing agent. Multifunctional epoxy resin (or polyepoxide) contains two or more epoxy functional groups per molecule.

Examples of suitable polyepoxides include the polyglycidyl ethers, which are prepared by reaction of epichlorohydrin or epibromohydrin with a polyphenol in the presence of alkali. Suitable polyphenols are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxy-benzophenone, bis(4-hydroxyphenyl)-1,1-ethane, and 1,5-hydroxynaphthalene.

Also included are the polyglycidyl ethers of polyalcohols. Such polyalcohols include ethylene glycol, diethylene glycol, triethylene glycol, 1,2-propylene glycol, 1,4-butylene glycol, triethylene glycol, 1,5-pentanediol, 1,6-hexanediol, and trimethylolpropane.

Additional epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides may include those derived from the epoxidation products of olefinically-unsaturated cycloaliphatic compounds or from natural oils and fats.

Also included are liquid epoxy resins which are reaction products of bisphenol A or bisphenol F and epichlorohydrin. These epoxy resins are liquid at room temperature and generally have epoxy equivalent weight (g/eq) of from about 150 to about 480 as determined by ASTM D-1652.

Particularly suitable are epoxy novolac resins which are polyglycidyl derivatives of phenol-formaldehyde novolacs or cresol-formaldehyde novolacs having the following chemical Structure I:

Structure I

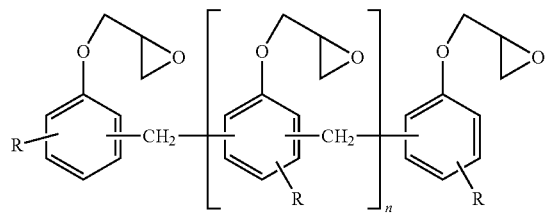

wherein n=0 to 5, and R=H or $CH_3$. When R=H, the resin is a phenol novolac resin. When R=$CH_3$, the resin is a cresol novolac resin. The former is commercially available as D.E.N. 428, D.E.N. 431, D.E.N. 438, D.E.N. 439, and D.E.N. 485 from Dow Chemical Co. The latter is commercially available as ECN 1235, ECN 1273, and ECN 1299 from Ciba-Geigy Geigy Corp. Other suitable novolacs that may be used include SU-8 from Celanese Polymer Specialty Co. In one embodiment, the epoxy novolac resin has a viscosity of 4000-10,000 mPa·s at 25° C. and epoxide equivalent weight (EEW) of about 190 g/eq to about 235 g/eq as determined by ASTM D-1652.

A particularly suitable multifunctional epoxy resin is a tetra-functional aromatic epoxy resin having four epoxy functional groups per molecule and at least one glycidyl amine group. An example is tetraglycidyl ether of methylene dianiline having the following general chemical Structure II:

Structure II

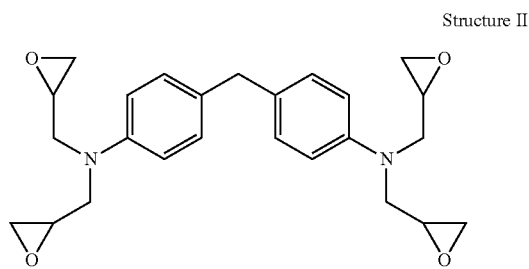 [SMILES: c1cc(N(CC2CO2)CC2CO2)ccc1Cc1ccc(N(CC2CO2)CC2CO2)cc1]

The amine groups in the structure are shown in the para- or 4,4' positions of the aromatic ring structures, however, it should be understood that other isomers, such as 2,1', 2,3', 2,4', 3,3', 3,4', are possible alternatives. Examples of commercially available tetra-functional epoxy resins are Araldite® MY 9663, MY 9634, MY 9655, MY-721, MY-720, MY-725 supplied by Huntsman Advanced Materials.

Another particularly suitable multifunctional epoxy resin is tri-functional epoxy resin having three epoxy functional groups per molecule, for example, triglycidyl ether of aminophenol. Specific examples of commercially available tri-functional epoxy resins are Araldite® MY 0510, MY 0500, MY 0600, MY 0610 supplied by Huntsman Advanced Materials.

Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol as represented by the following Structure III:

Structure III

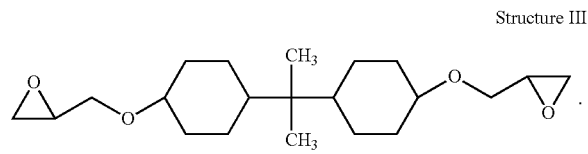

An example of such cycloaliphatic epoxy resin is EPAL-LOY® 5000 (a cycloaliphatic epoxy prepared by hydrogenating bisphenol A diglycidyl ether) available from CVC Thermoset Specialties. Other cycloaliphatic epoxides suitable for use in the pre-react adduct may include EPONEX cycloaliphatic epoxy resins, e.g. EPONEX Resin 1510 supplied by Momentive Specialty Chemicals.

The thermoset resin composition may be formulated so as to yield high $T_g$ and high cross-linked density. In some embodiments, a combination of epoxy novolac resin(s) and non-novolac multifunctional epoxy resin(s), particularly, tri-functional and/or tetra-functional epoxy, is used. The relative amounts of epoxy novolac resin and non-novolac multifunctional epoxy resin may be varied but it is preferred that the amount of epoxy novolac resin is with the range of about 80 to about 100 parts per 100 parts of non-novolac multifunctional epoxy resin. The combination of epoxy novolac resin and multifunctional epoxy resin at the specified proportion contribute to the desired high $T_g$ and cross-linked density upon curing.

The total amount of all resins makes up at least 15% by weight based on the total weight of the resin composition. As an example, the total amount of resins may constitute about 30% to about 60% by weight based on the total weight of the resin composition, or about 15% to about 25% by weight.

The thermoset resin composition may further include one or more polymeric toughening agents. The polymeric toughening agents may be selected from: thermoplastic polymers, elastomers, core-shell rubber particles, a pre-react adduct which is a reaction product of an epoxy resin, a bisphenol, and an elastomeric polymer, and combinations thereof. In some embodiments, a combination of two different toughening agents from this group is used. The amount of toughening agent(s), in total, may be about 1% to about 30%, in some cases, about 10% to about 20%, by weight based on the total weight of the composition.

With regard to the pre-react adduct, suitable epoxy resins include diglycidylether of Bisphenol A, diglycidylether of tetrabromo Bisphenol A, hydrogenated diglycidyl ether of bisphenol A, or hydrogenated diglycidyl ether of bisphenol F.

The bisphenol in the pre-react adduct functions as a chain extension agent for the linear or cycloaliphatic epoxy. Suitable bisphenols include bisphenol A, tetrabromo bisphenol A (TBBA), Bisphenol Z, and tetramethyl Bisphenol A (TMBP-A).

Suitable elastomers for forming the pre-react adduct include, but are not limited to, liquid elastomers such as amine-terminated butadiene acrylonitrile (ATBN), carboxyl-terminated butadiene acrylonitrile (CTBN), and carboxyl-terminated butadiene (CTB). Also possible are fluorocarbon elastomers, silicone elastomers, styrene-butadiene polymers. In an embodiment, the elastomer used in the pre-react adduct is ATNB, CTBN or CTB.

In one embodiment, the epoxy resin is reacted with the bisphenol chain extension agent and the elastomer polymer in the presence of a catalyst, such as triphenyl phosphine (TPP), at about 300° F. (or 148.9° C.) to chain link the epoxy resins and to form a high viscosity, film-forming, high molecular-weight epoxy resin pre-react adduct. The pre-react adduct is then mixed with the remaining components of the thermoset composition.

Suitable thermoplastic tougheners include polyarylsulfone polymers such as polyether sulfone (PES), polyether ether sulfone (PEES). In some embodiments, the toughening agent is a copolymer of PES and PEES, which is described in U.S. Pat. No. 7,084,213. In some embodiments, the toughener is poly(oxy-1,4-phenylenesulfonyl-1,4-phenylene), which has a $T_g$ of about 200° C. as measured by Differential Scanning calorimetry (DSC).

The toughening agent may be core-shell rubber (CSR) particles having particle size of 300 nm or less. Particle size can be measured by a laser diffraction technique, for example, using a Malvern Mastersizer 2000 instrument. The CSR particles may be any of the core-shell particles where a soft core is surrounded by a hard shell. Preferred CSR particles are those having a polybutadiene rubber core or butadiene-acrylonitrile rubber core and a polyacrylate shell. CSR particles having a hard core surrounded by a soft shell may also be used, however. The CSR particles may be supplied as a 25%-40% in weight percentage of CSR particles dispersed in a liquid epoxy resin. CSR particles having rubber cores and polyacrylate shells are available commercially from Kaneka Texas Corporation (Houston, Tex.) under the trade names Kane Ace MX. It is preferred, but not required, that the core-shell rubber particles be added to the surfacing film composition as a suspension of particles in a suitable liquid epoxy resin. Kane Ace MX 411 is a suspension of 25% by weight core-shell rubber particles in MY 721 epoxy resin and is a suitable source of core-shell rubber particles. Kane Ace MX 120, MX 125, or MX 156, which contains 25-37% by weight of the same core-shell rubber particles dispersed in DER 331 resin, is also a suitable source of core-shell rubber particles. Other suitable source of core-shell rubber particles, such as MX 257, MX 215, MX217 and MX 451, may also be used. Another commercial source of core-shell rubber particles is Paraloid™ EXL-2691 from Dow Chemical Co. (methacrylate-butadiene-styrene CSR particles with average particle size of about 200 nm).

Ceramic microspheres may be added to the thermoset resin composition to improve the surface smoothness of the final surfacing film. In one embodiment, hollow, ceramic microspheres made of an inert silica-alumina ceramic material are used. The ceramic microspheres may have a crush strength of over 60,000 psi, a dielectric constant of about 3.7-4.6, a softening point in the range of 1000-1100° C. (or 1832-2012° F.), and particle diameters ranging from 0.1 micron to 50 microns, or 1-50 microns. The high softening point of the ceramic microspheres enables them to be nonabsorbent to solvents, non-flammable, and highly resistant to chemicals. Microspheres having diameters ranging from about 0.1 μm to about 20 μm, and preferably from about 1 μm to about 15 μm, have been found to be particularly suitable. An example of commercially available ceramic microspheres which are particularly suitable for use in the present resin film composition are sold by Zeelan Industries, Inc. under the trade name Zeeospheres 0, for example, G-200, G210 and W-200. These are hollow, silica-alumina spheres with thick walls, odorless, and light gray in color. In a preferred embodiment, the combination of the multifunctional resins and ceramic microspheres makes up more than 50% by weight, preferably more than 60% by weight, of the resin film composition. In certain embodiments, the amount of ceramic microspheres is at least 20% by weight, preferably at least 25% or at least 30% by weight, based on the total weight of the resin film composition. In some embodiments, the amount of ceramic microspheres may be within the range of 20%-40% by weight, or 25%-35% by weight. In other embodiments, the amount of ceramic microspheres may be within the range of 3%-15% by weight, or 5%-10% by weight.

Suitable curing agents include a variety of latent amine-based curing agents, which are activated at elevated temperatures (e.g. temperature above 150° F. (65° C.)). The term "amine-based" means containing an amine compound or group. Examples of suitable curing agents include dicyandiamide (DICY), 4,4'-diamino-diphenylsulfone (4,4'DDS), and 3,3'-diaminodiphenylsulfone (3,3'DDS), guanamine, guanidine, aminoguanidine, piperidine, combinations and derivatives thereof. Compounds in the class of imidazoles and amine complexes may also be used. In an embodiment, the curing agent is dicyandiamide. The amine curing agent is present in an amount within the range of about 1% to about 5% by weight based on the total weight of the resin film composition.

A curing accelerator may be used in conjunction with the amine-based curing agent to promote the curing reaction between the epoxy resins and the amine-based curing agent. Suitable curing accelerators may include alkyl and aryl substituted ureas (including aromatic or alicyclic dimethyl urea), and bisureas based on toluenediamine or methylene dianiline. One example of bisurea is 4,4'-methylene bis (phenyl dimethyl urea), commercially available as Omicure U-52 or CA 152 from CVC Chemicals, which is a suitable accelerator for dicyandiamide. Another example is 2,4-toluene bis(dimethyl urea), commercially available as Omicure U-24 or CA 150 from CVC Chemicals. The curing accelerator may be present in an amount within the range of about 0.5% to about 3% by weight based on the total weight of the thermoset composition.

The resin composition may further include conductive materials in particulate form, e.g., in the form of particles or flakes, to increase the electrical conductivity to the surfacing materials. Examples of suitable conductive materials include metals such as silver, gold, nickel, copper, aluminum, bronze, and alloys thereof, in the form of flakes or particles. Carbon-based materials, such as carbon nano-tubes (single-wall nano tubes or multi-wall nano tubes), carbon nano-fibers, and graphene may also be used as conductive additives to impart the electrical conductivity to the resin film. The nano-fibers may have diameters ranging from 70 to 200 nanometers and a length of about 50-200 microns. The nano-tubes may have an outer diameter of about 10 nanometers, length of about 10,000 nanometers, and an aspect ratio (L/D) of about 1000. In addition, conductive additives may also include carbon black particles (such as Printex XE2 from DeGussa). If present, the amount of conductive materials may be in the range of about 3% to about 70% by weight based on the total weight of the resin composition.

Inorganic fillers in particulate form (e.g., powder) may be added to the resin film composition as a rheology modifying component to control the flow of the resinous composition and to prevent agglomeration therein. Suitable inorganic fillers that may be used in the resin film composition include talc, mica, calcium carbonate, alumina, and fumed silica. In one embodiment, hydrophobic fumed silica (e.g. Cab-O-Sil TS-720) is used as the inorganic filler. The amount of inorganic filler may be within the range of 1%-5% by weight based on the total weight of the resin film composition.

The resin composition may further include one or more optional additives such as ultraviolet (UV) stabilizers, pigments and dyes. When such additives are used, their total amount is less than 5% by weight based on the total weight of the resin film composition.

UV stabilizers may be added to the resin composition and include butylated hydroxytoluene (BHT); 2-hydroxy-4-methoxy-benzophenone (e.g. UV-9); 2,4-bis(2,4-dimethylphenyl)-6-(2-hydroxy-4-octyloxyphenyl)-1,3,5-triazine (e.g. CYASORB® UV-1164 light absorber); 3,5-di-tert-butyl-4-hydroxybenzoic acid; n-hexadecyl ester (e.g. CYASORB® UV-2908 light stabilizer); Pentaerythritol Tetrakis (3-(3,5-di-tert-butyl-4-hydroxyphenyl) propionate (e.g. IRGANOX 1010). Liquid hindered-amine light stabilizer from Ciba Specialty Chemicals, such as 2-(2H-benzotriazol-2-yl)-4,6-ditertpentylphenol (e.g. TINUVIN 328), Methyl 1,2,2,6,6-pentamethyl-4-piperidyl sebacate (e.g. TINUVIN 292). Decanedioic acid, bis(2,2,6,6-tetramethyl-1-(octyloxy)-4-piperidinyl ester (e.g. TINUVIN 123), may also be used as suitable UV stabilizers. In addition, nano-sized zinc oxide (n-ZnO), e.g. NanoSunGuard 3015, and NanoBYK 3820; cerium oxide nanoparticles (n-CeO2), e.g. NanoBYK 3810 or 3840; and titanium oxide nanoparticles (n-TiO2) may also be used as UV stabilizers.

Pigments and/or dyes known in the art for adding color to resinous systems may be added to the thermoset resin composition. Examples of pigments and/or dyes include, but are not limited to, red iron oxide, green chromium, carbon black, and titanium oxide. In an embodiment, titanium oxide (white) pigment is added the resin film composition. In another embodiment, carbon black pigment is added. In another embodiment, graphene or graphite oxide is added.

In one embodiment, the curable resin layer in the multi-layer surfacing material is formed from a resin composition containing: an epoxy novolac resin having epoxy functionality of more than one; a tri-functional or tetra-functional epoxy resin; ceramic microspheres; an amine curing agent; and at least one toughening agent selected from a group consisting of: (i) a pre-react adduct formed by the reaction of an epoxy resin, a bisphenol, and an elastomer; (ii) a copolymer of polyether sulfone (PES) and polyetherether sulfone (PEES); (iii) core-shell rubber (CSR) particles; and combinations thereof. In one embodiment, the pre-react adduct is formed by the reaction of diglycidylether of tetrabromo Bisphenol A, bisphenol A, and an elastomer selected from: amine-terminated butadiene acrylonitrile (ATBN); carboxyl-terminated butadiene acrylonitrile (CTBN); and carboxyl-terminated butadiene (CTB). The epoxy resins and the ceramic microspheres make up more than 35% by weight of the total composition, preferably more than 45% by weight.

In another embodiment, the resin composition of the curable resin layer has the following formulation, in weight percentages based on the total weight of the composition: 20%-25% epoxy phenol novolac resin; 20%-25% tri- or tetra-functional epoxy resin; 10%-15% pre-react adduct, 1%-3% PES-PEES copolymer, 25%-35% ceramic microspheres; 1%-3% fumed silica; 1%-5% amine curing agent; 0.5%-3% curing accelerator; and optionally 0.1-1% color pigment.

The components of the resin composition may be added to a mixing vessel equipped for mixing, heating, and/or cooling the components. Furthermore, one or more organic solvents may also be added to the mixture, as necessary, to facilitate the mixing of the components. Examples of such solvents may include, but are not limited to, methyl ethyl ketone (MEK), acetone, dimethylacetamide, and N-methylpyrrolidone. A resin film is subsequently formed from the resin composition using conventional film-forming processes.

Applications

The surfacing material disclosed herein can be applied onto and co-cured with a fiber-reinforced, resin-impregnated composite substrate at a temperature above 150° F. (65° C.), more particularly, within the range of 200° F. to 365° F. (93° C. to 185° C.) or 250° F. to 350° F. (121° C. to 177° C.).

Composite substrates in this context refer to fiber-reinforced resin composites, including prepregs or prepreg layups (such as those used for making aerospace composite structures). The term "prepreg" as used herein refers to a layer of fibrous material (e.g. unidirectional tows or tape, nonwoven mat, or fabric ply) that has been impregnated with a curable matrix resin. The matrix resin in the composite substrates may be in an uncured or partially cured state. The fiber reinforcement material may be in the form of a woven or nonwoven fabric ply, or unidirectional tape. "Unidirectional tape" refers to a layer of reinforcement fibers, which are aligned in the same direction. The term "prepreg layup" as used herein refers to a plurality of prepreg plies that have been laid up in a stacking arrangement.

Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements.

The term "impregnate" refers to the introduction of a curable matrix resin to reinforcement fibers so as to partially or fully encapsulate the fibers with the resin. The matrix resin for making prepregs may take the form of resin films or liquids. Moreover, the matrix resin is in a curable/uncured state prior to bonding. Impregnation may be facilitated by the application heat and/or pressure.

The reinforcement fibers may be formed of materials selected from: glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

The matrix resin of the composite substrate and prepregs is similar to the thermoset resin composition described above in reference to the curable resin layers of the surfacing material. It contains one or more thermoset resins, e.g., epoxy resins, as the major component, a curing agent, and other additives such as catalysts, co-monomers, rheology control agents, tackifiers, rheology modifiers, inorganic or organic fillers, thermoplastic or elastomeric toughening agents, stabilizers, inhibitors, pigments/dyes, flame retardants, reactive diluents, and other additives well known to those skilled in the art for modifying the properties of the resin matrix before or after curing.

Terminology

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

What is claimed is:

1. A self-releasing surfacing material that is capable of ultraviolet (UV) protection, comprising a curable resin layer laminated to a releasable layer,
   wherein
   the curable resin layer comprises one or more thermoset resins,
   the releasable layer is consisted of a polymer layer coated on one side or both sides with a coating of fluoropolymer,
   wherein the polymer layer is formed from a material selected from the group consisting of: thermoplastic polyester elastomers; mixture of polypropylene and ethylene-propylene-diene rubber (EPDM/PP); mixture of natural rubber and polypropylene (NR/PP); mixtures of nitrile rubber and polypropylene (NBR/PP); mixtures of ethylene-vinyl acetate and polyvinylidene chloride (EVA/PVDC); and combinations thereof;

the fluoropolymer is selected from the group consisting of: polytetrafluoroethylene (PTFE), polyvinylidene fluoride (PVDF), polyvinylfluoride (PVF), fluorinated ethylene-propylene (FEP), polychlorotrifluoroethylene (PCTFE), perfluoroalkoxy polymer (PFA), polyethylenetetrafluoroethylene (ETFE), polyethylenechlorotrifluoro-ethylene (ECTFE), perfluoropolyether (PFPE), and combinations thereof, and the releasable layer is positioned such that one coating of fluoropolymer is an outermost layer with an exposed surface.

2. The self-releasing surfacing material of claim 1, wherein the polymer layer further comprises a Ultraviolet (UV) stabilizer or absorber.

3. The self-releasing surfacing material of claim 1, wherein the polymer layer further comprises an additive selected from the group consisting of: metal oxide pigments, color dyes, carbon-based materials, and combination thereof.

4. The self-releasing surfacing material according to claim 3, wherein the polymer layer further comprises carbon black.

5. The self-releasing surfacing material of claim 1, wherein the curable resin layer has a film weight in the range of 50-250 gsm.

6. The self-releasing surfacing material of claim 1, wherein the curable resin layer does not comprise any reinforcement fiber.

7. The self-releasing surfacing material of claim 1, further comprising an electrically conductive layer laminated to one side of the curable resin layer such that the curable resin layer is between the releasable layer and the conductive layer.

8. The self-releasing surfacing material according to claim 7, wherein the electrically conductive layer is selected from the group consisting of: a porous metal screen, a solid metal foil, and a sheet of carbon.

9. The surfacing material of claim 1, wherein the thermoset resin is multifunctional epoxy resin and further comprises an amine curing agent.

10. The surfacing material of claim 1, wherein the curable resin layer is formed from a resin composition comprising:
an epoxy novolac resin having epoxy functionality of more than one;
a tri-functional or tetra-functional epoxy resin that is not an epoxy novolac resin;
ceramic microspheres;
an amine-based curing agent;
at least one toughening agent selected from the group consisting of: (i) a pre-react adduct formed by the reaction of an epoxy resin, a bisphenol, and an elastomer; (ii) a copolymer of polyether sulfone (PES) and polyetherether sulfone (PEES); and (iii) core-shell rubber (CSR) particles.

11. The surfacing material according to claim 10, wherein the resin composition further comprises fumed silica.

12. A method for forming a composite structure with an outer surface that is ready for painting, the method comprising:
placing the surfacing material of claim 1 onto a mold surface of a molding tool such that the releasable layer is in contact with the mold surface;
forming a prepreg layup of multiple prepreg plies on the surfacing material, each prepreg ply comprising reinforcement fibers impregnated with or embedded in a curable matrix resin;
co-curing the surfacing material and the prepreg layup so as to form a cured composite structure;
removing the cured composite structure from the molding tool; and
removing the releasable layer to reveal a hardened or cured surface that is ready for painting.

13. The method of claim 12, wherein co-curing is carried out in the temperature range of 250° F. to 350° F.

* * * * *